United States Patent [19]

Ellis et al.

[11] Patent Number: 5,450,385
[45] Date of Patent: Sep. 12, 1995

[54] DETERMINATION OF STATUS OF STORAGE CELLS IN AN AUTOMATED STORAGE AND RETRIEVAL SYSTEM

[75] Inventors: John F. Ellis; Frank D. Gallo; Gary F. Gooding; Scott M. Rockwell, all of Tucson, Ariz.

[73] Assignee: International Business Machines Corporation, Armonk, N.Y.

[21] Appl. No.: 112,526

[22] Filed: Aug. 27, 1993

[51] Int. Cl.6 ..................... G11B 17/22; G06F 12/00
[52] U.S. Cl. ........................ 369/34; 369/36; 395/427; 235/385
[58] Field of Search ............... 369/30, 33, 34, 194, 369/36, 37, 75.1; 395/275, 600, 425, 650, 725; 360/92, 90; 364/571.01, 571.04, 516, 579; 414/282, 267, 274; 235/385, 462

[56] References Cited

U.S. PATENT DOCUMENTS

| | | | |
|---|---|---|---|
| 3,557,977 | 1/1971 | Atwater | 414/282 |
| 3,681,607 | 8/1972 | Hartman, III | 250/222.1 |
| 3,690,479 | 9/1972 | Castaldi | 414/274 |
| 3,715,040 | 2/1973 | Polus et al. | 414/267 |
| 4,636,634 | 1/1987 | Harper et al. | 250/223 R |
| 4,979,135 | 12/1990 | Moy | 364/571.01 |
| 5,034,904 | 7/1991 | Moy | 364/571.04 |
| 5,121,483 | 6/1992 | Monahan et al. | 395/275 |

FOREIGN PATENT DOCUMENTS 56-48309 5/1981 Japan.
58-64665 4/1983 Japan.
3162763 11/1989 Japan.

Primary Examiner—Ali Neyzari
Attorney, Agent, or Firm—D. A. Shifrin

[57] ABSTRACT

Each storage cell in an automated storage and retrieval system is provided with a mark, such as a bar code label, which is detectable to a vision system when the cell is empty. Further, each item storable in a cell is also provided with a mark, such as a bar code label uniquely identifying the item, which is detectable by the vision system. During an inventory of the contents of the system, the vision system is moved across the openings of the cells and scans for the marks. If an item mark is detected, entries in a data table are made indicating the location of the cell being scanned and its occupied status. The identity of the item detected can also be entered into the data table. On the other hand, if a cell mark is detected, entries in a data table are made indicating the location of the cell being scanned and its empty status. If neither mark is detected at a cell, additional steps can be initiated to determine the status of the cell. Consequently, the location of each empty cell and each occupied cell can be positively identified and recorded in a single scanning operation. The identity of each stored item can also be recorded with its location in the same operation.

7 Claims, 4 Drawing Sheets

DETERMINATION OF STATUS OF STORAGE CELLS IN AN AUTOMATED STORAGE AND RETRIEVAL SYSTEM

TECHNICAL FIELD OF THE INVENTION

The present invention relates to automated storage and retrieval systems, and in particular, to a method and apparatus for positive detection of both empty and occupied storage cells in such a system.

BACKGROUND OF THE INVENTION

In an automated information storage and retrieval system, also known as a library, numerous cells arrayed within the library are used to hold information media, such as magnetic tape cartridges or optical disks. (The term "cartridge" used herein refers to any retaining structure for information media. Although the present invention is described herein with respect to a magnetic tape library storing tape cartridges, it is not so limited but is equally applicable, for example, to an optical library holding optical disk cartridges, cartridge-less optical disks, optical tape cartridges and the like.) An accessor, furnished with a holding or gripping device and under the direction of a library controller, transports a selected cartridge between the cartridge's cell and a drive unit. The library controller is interconnected with a host device, such as a mainframe computer, which issues control signals related to reading/writing data from/to selected cartridges.

Library units also typically include an input/output station or port through which a system operator can pass a cartridge to be added to the array and through which the accessor can pass a cartridge to the operator for removal.

It will be appreciated that the library controller must "know" the identity of each cartridge and its location within the array of cells in order to be able to retrieve the cartridge for access. Typically, each cartridge has a unique identifying mark, such as a bar code label, on an edge of the cartridge visible through the cell opening. A vision system, such as a bar code reader, on the accessor can read the label when the accessor is positioned proximate to the cell. During an inventory of the library, such as when a new library has been installed, the vision system scans the cells and reports to the library controller the identity and location of stored cartridges. The library controller records the identity and location information in a database and later refers to it when a cartridge is to be retrieved or replaced or when a cartridge is imported from the outside and has to be stored in an empty cell. An inventory must also be taken each time a library access door is opened by the operator since it is not known whether the operator has added cartridges to the array, has removed cartridges, or has done nothing at all. If a cartridge label cannot be detected or read when the accessor is proximate to a cell, that cell is assumed to be empty.

However, the vision system may mistakenly classify a cell as being empty when, in fact, the cell is actually occupied. For example, a cartridge may occupy the cell but have an unreadable label, or even no label. A cartridge may be mis-oriented within the cell or a foreign object may occupy the cell. If the accessor attempts to insert a cartridge into such an occupied cell, an error condition will result causing a time consuming error recovery procedure to be initiated.

One known system attempts to reduce such non-empty errors by directing the accessor's gripper to attempt to reach inside every cell which does not have an identifiable cartridge and verify by "touch" that the cell is actually empty. Any cell which is still not found to be empty is classified in the database as having an "occupied but invalid" status to prevent its use. An inventory of a 400 cell library, for example, can take three or four hours to complete using this system.

OBJECTS AND SUMMARY OF THE INVENTION

In view of the foregoing, it is an object of the present invention to positively identify each cartridge and positively locate each empty cell in a library without a time consuming physical verification of the actual status of cells reported as being not occupied.

It is a further object to positively identify each cartridge and positively locate each empty cell in a library in a single scanning operation.

These and other objects are achieved in this invention by providing each cell in a library with a mark, such as a bar code label, which is detectable to a vision system only when the cell is empty. Further, each cartridge is also provided with a mark, such as a bar code label uniquely identifying the cartridge, which is also detectable by the vision system when the cartridge properly occupies a cell. During an inventory of the contents of the library, the vision system is moved across the openings of the cells and scans for the marks. If a cartridge mark is detected, entries in a data table are made indicating the location of the cell being scanned (based upon its coordinates) and its occupied status. The identity of the cartridge detected can also be entered into the data table with the cell location and status. On the other hand, if a cell mark is detected, entries in a data table are made indicating the location of the cell being scanned and its empty status. Consequently, the location of each empty cell and each occupied cell can be positively identified and recorded in a single scanning operation. The identity of each cartridge can also be recorded with its location in the same operation.

The foregoing and other features and advantages of the invention will be apparent from the following more particular description of preferred embodiments of the invention, as illustrated in the accompanying drawings.

DETAILED DESCRIPTION OF THE INVENTION

Figure 1:
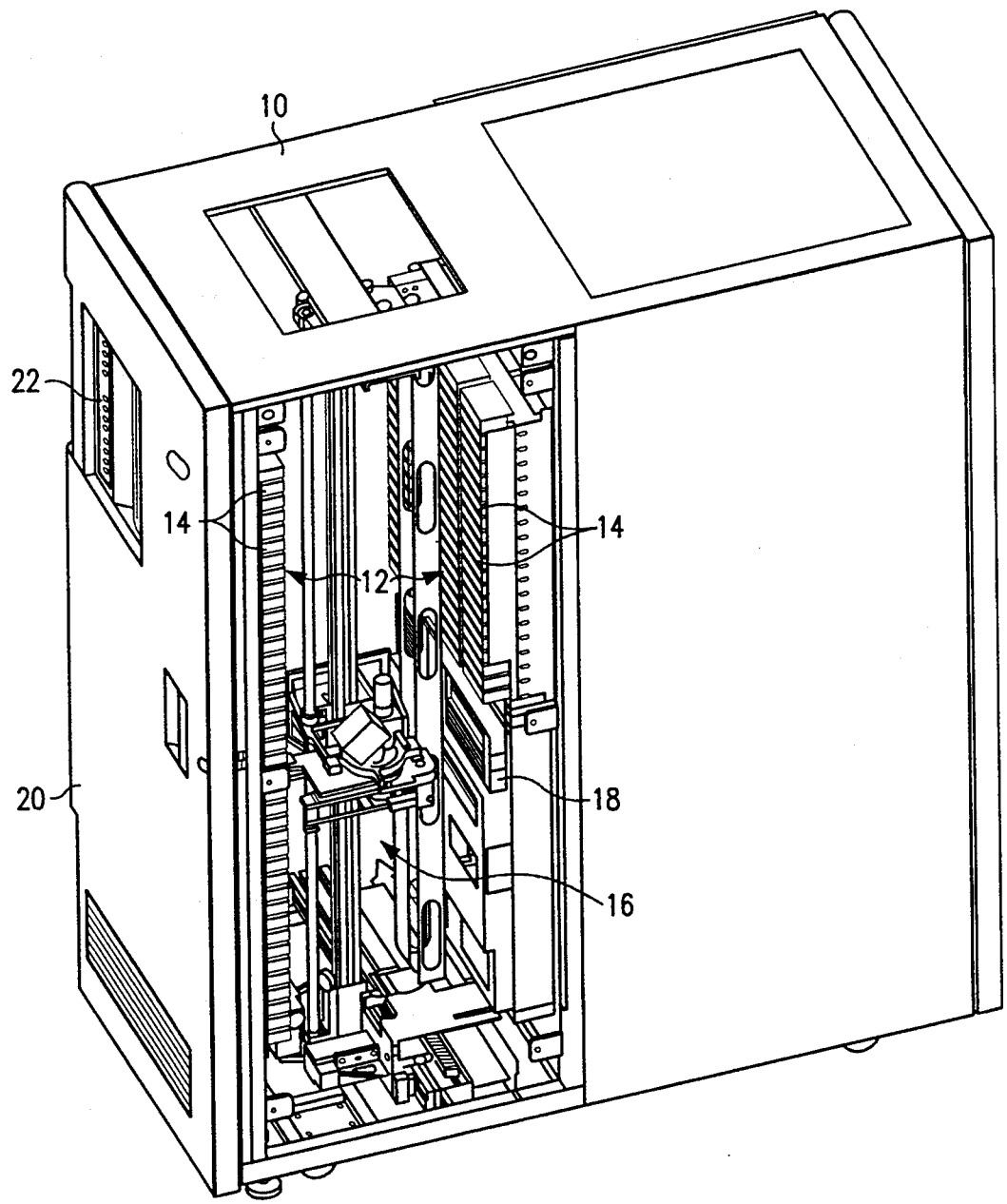
FIG. 1 is a front and right side view of a magnetic tape library with a side panel removed.
Figure 2:
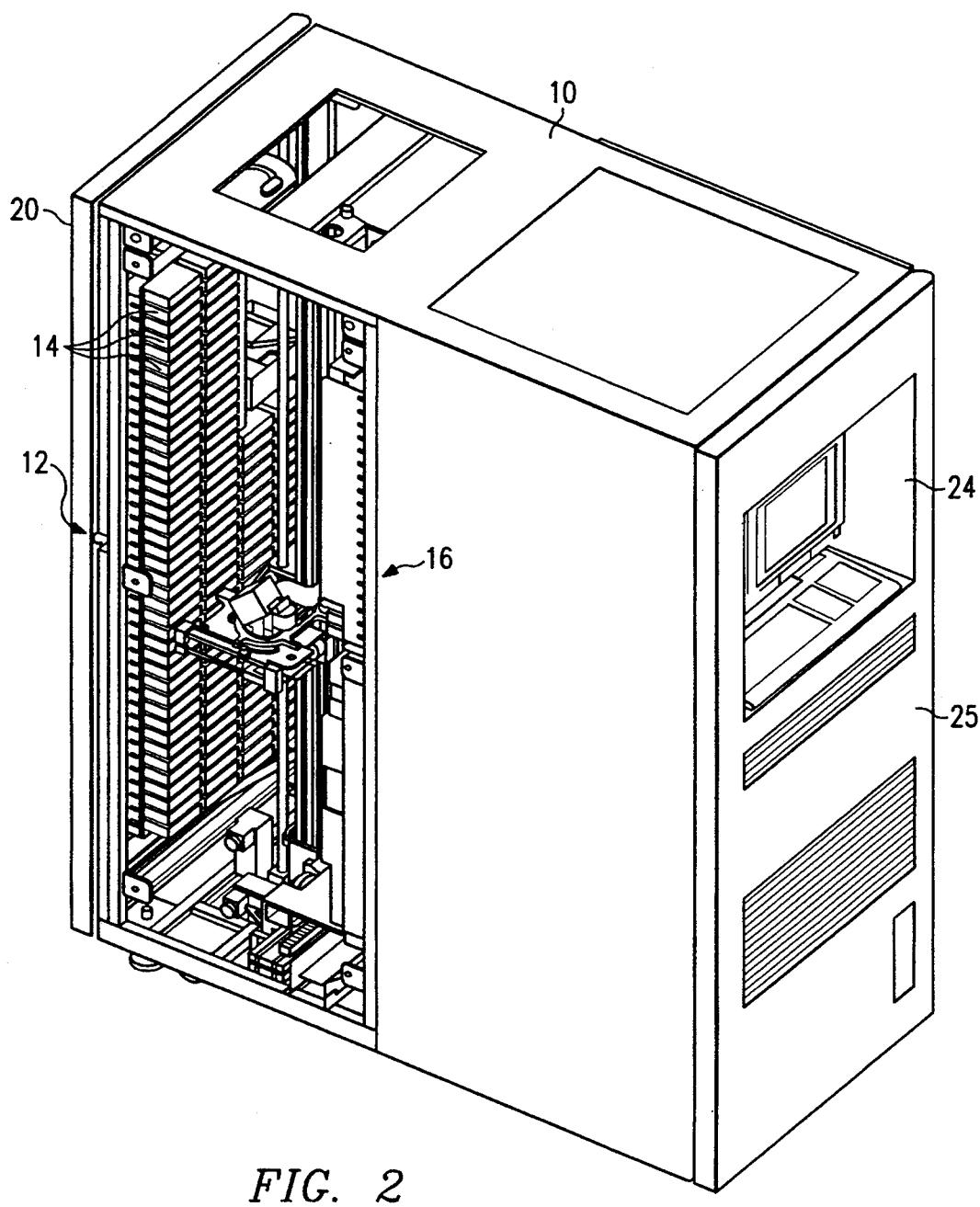
FIG. 2 is a back and left side view of the magnetic tape library of FIG. 1 with another side panel removed.

FIG'S. 1 and 2 illustrate an automated storage and retrieval system (library) 10 for magnetic tape cartridges with side panels removed to show the interior of the library 10. The library 10 includes an array of storage slots or cells 12 arranged in columns on two of the interior walls for holding magnetic tape cartridges 14. An accessor 16 includes a gripper for transporting one of the cartridges 14 between its cell 12 and a tape drive unit 18 (of which there can be more than one). The accessor 16 is capable of motion in the X, Y and Z axes and the gripper is capable of pivoting to remove and replace cartridges from and to the cells on both walls.

A lockable front door 20 on the library 10 permits manual loading and unloading of the cells 12 (such as during the installation of a new library) as well as providing maintenance access for the accessor 16, the drive 18 or other interior elements. The front door 20 of the illustrated library 10 also includes an input/output station 22 through which the accessor 16 can accept cartridges from the operator for entry into the library 10, and return cartridges for removal, without the operator having to open the door 20. The I/O station 22 has storage cells to accommodate, for example, up to ten incoming or outgoing cartridges at a time. A terminal 24 is included in the back of the library 10 to allow the library operator to communicate with a library controller 25 located in the rear portion of the library 10. The library controller 25 interfaces with a host device (not shown), such as a computer, and directs the operation of the accessor 16, the drive 18 and the transmission of data between the host and the drive 18.

Figure 3:
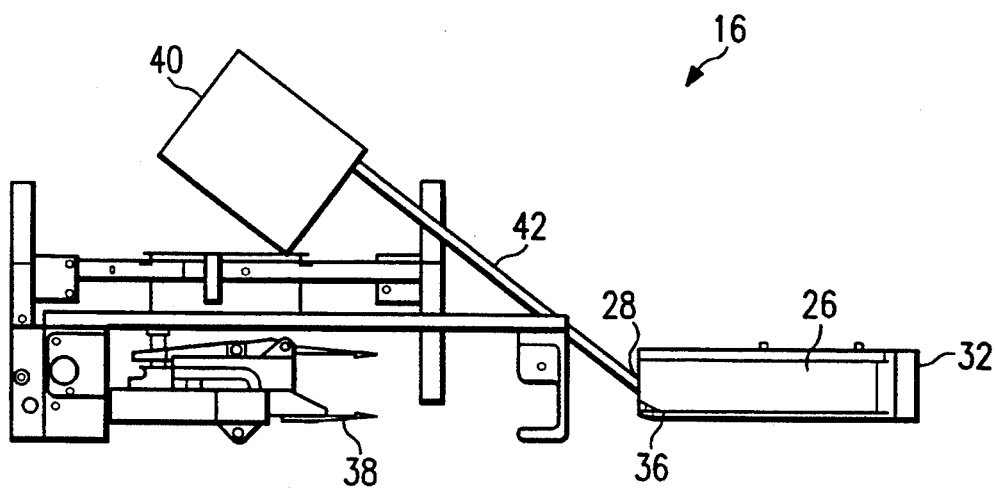
FIG. 3 is a cross sectional view of a gripper unit and vision system of the tape library of FIGS. 1 and 2 scanning an occupied storage cell.
Figure 4:
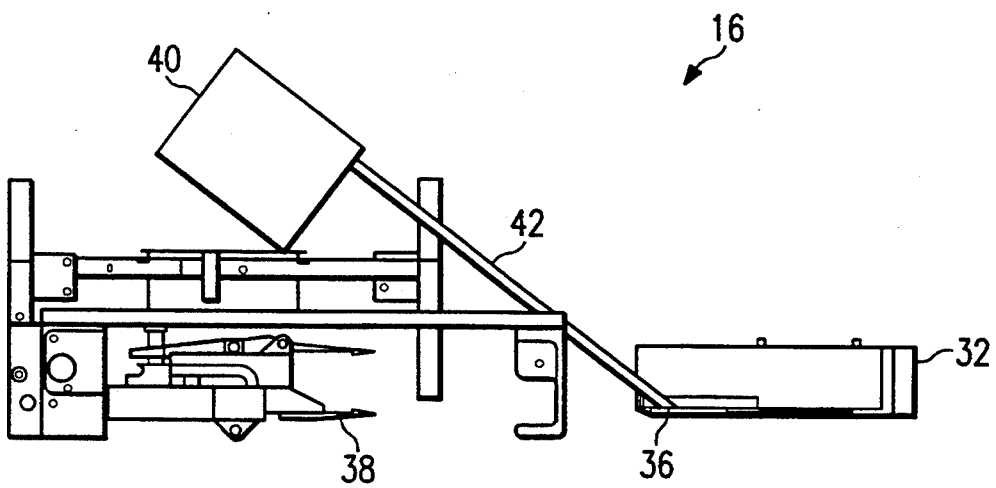
FIG. 4 is a cross sectional view of the gripper unit and vision system of FIG. 3 scanning an empty storage cell.
Figure 5:
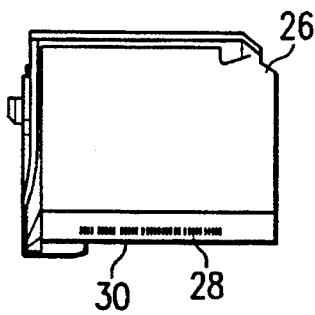
FIG. 5 illustrates a magnetic tape cartridge with an identifying marking as seen by the vision system of FIG. 3.
Figure 6:
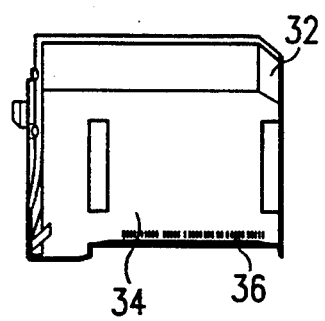
FIG. 6 illustrates an empty storage cell as seen by the vision system.

FIG. 5 illustrates a cartridge 26, with an identifying mark 28 or indicia on the front edge 30, and FIG. 6 illustrates a top view of a storage cell 32, with an identifying mark 36 on the inside bottom surface 34. Each cartridge mark 28 should be unique to the individual cartridge, such as the bar code label 28 shown in the FIG. 5. The cell mark need not be unique to the cell (although it can be); the cell 32 can have a bar code label 36 with the same code as each other cell in the array 12 (but different, of course, from the code on any cartridge label). Alternatively, the cell mark can be a thin piece of reflective material or other mark detectable by the vision system 16. FIG'S. 3 and 4 are cross-sectional views of a gripper mechanism 38 and vision system, such as a bar code reader 40, of the accessor 16. In FIG. 3, the reader 40 is shown scanning the label 28 of the cartridge 26 in the storage cell 32. FIG. 5 illustrates the view from the reader 40 of the cartridge 26 when the cell 32 is occupied, the cartridge 26 blocking the cell label 36 from the vision path 42 of the reader 40. On the other hand, when the cell 32 is empty, as illustrated in FIG. 4, FIG. 6 illustrates the view from the reader 40, the cell label 36 now visible to the reader 40 through the front of the cell 32 and able to be detected and read.

Figure 7:
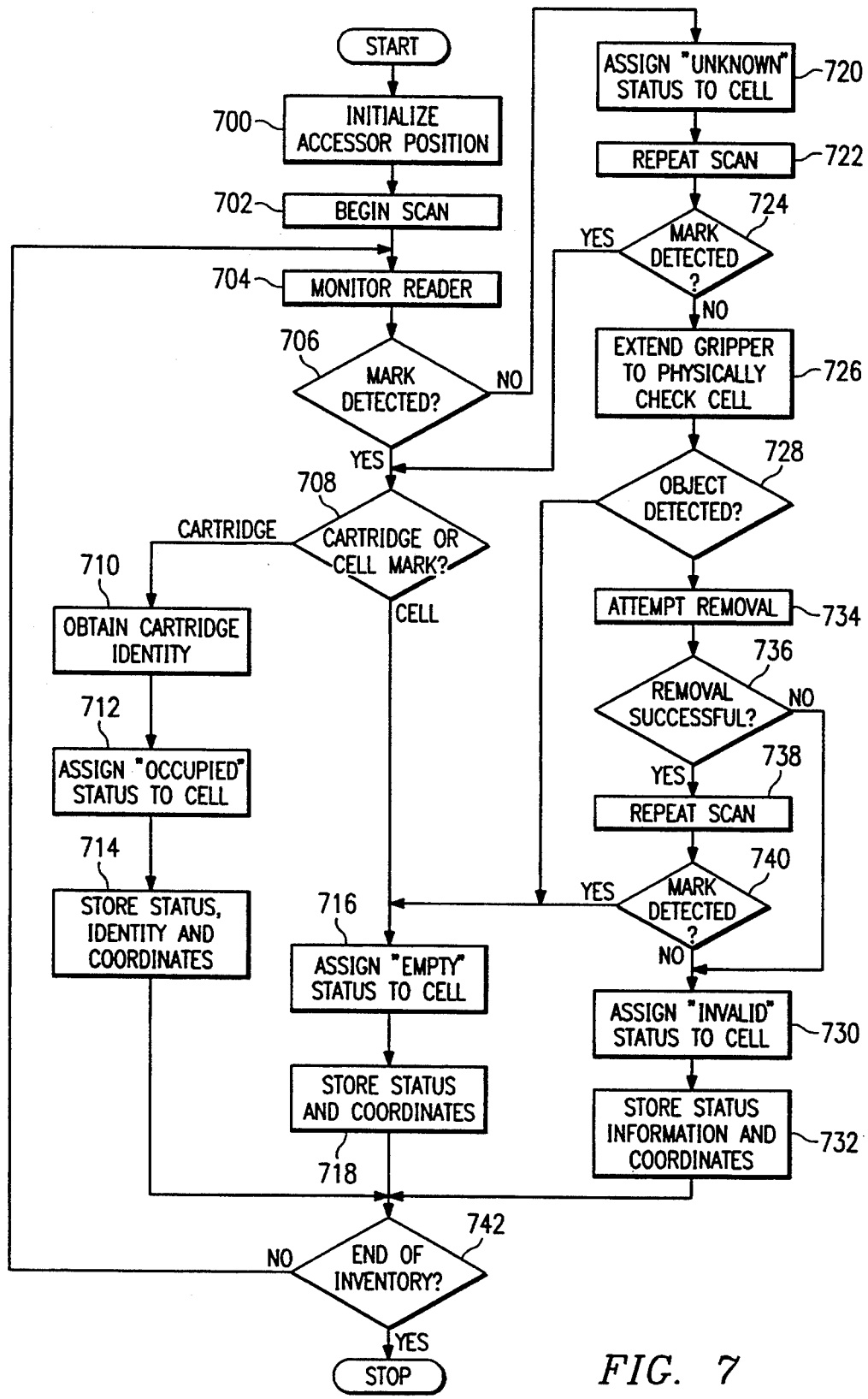
FIG. 7 is a flow chart of an embodiment of detection and processing steps of the present invention.

FIG. 7 is a flow chart of the inventory process of the present invention. First, the accessor 16 is moved to an initial position (Step 700), such as with the gripper 38 and reader 40 in front of the bottom cell of an outer column on the front wall of the library 10. The reader 40 is activated and moved upwardly by the accessor 16 to the top of the column (Step 702). The reader 40 scans (Step 704) each cell in the column to detect and read either a cartridge label 28 or a cell label 36 (Step 706).

The label information from each cartridge or cell is transmitted to the library controller 25 where it is stored in a database or table with the coordinates of the location of the cell. Depending upon the scanning algorithm employed, the accessor 16 can cause the reader 40 to scan up the first column, then scan down the next, etc. or can cause the reader 40 to scan up the first column, return to the bottom and scan up the next column, etc. Additionally, scanning can occur in a single sweep of an entire column or can scan a column in blocks of, for example, twenty cells each, with a slight pause between blocks for processing the label information. If the library controller 25 determines (Step 708) that a detected label is a cartridge label 28, the cell is given an "occupied" status and the cell status, its location and the cartridge identity are stored in the database (Steps 710, 712, 714). If, instead, the library controller 25 determines that a detected label is a cell label 36, the cell is given an "empty" status and the cell status and location are stored (Steps 716, 718).

Occasionally, the reader 40 (in Step 706) will be unable to detect or read a label and the cell will be given an "unknown" status (Step 720). In this event, the accessor 16 will position the reader 40 to make a second scan of the cell (Step 722). If a label is detected (Step 724) and read, the cell information is processed and stored in the previously described fashion (Steps 708–718). If no label can be detected or read after the second attempt, the gripper 38 is positioned in front of the cell in question and extended to physically determine the status of the cell (Step 726). If the gripper 38 in Step 728 detects nothing in the cell, the cell is assumed to be empty and assigned an "empty" status (Step 716) which is stored (Step 718) in the library controller 25. If the gripper 38 detects an object in the cell, it can attempt to remove the object (Step 734); if unsuccessful (Step 736), the library controller 25 notes the invalid status (Step 730) in the database (Step 732) and removes the cell from service until inspected by the operator. On the other hand, if removal is successful, the reader 40 repeats the scan (Step 738). If no mark is again detected (Step 740), the cell is invalid and the status information stored (Steps 730 and 732). If mark detection is successful (Step 740), the cell is empty and processed in the manner described with reference to Steps 716 and 718. Once the entire inventory has been completed (Step 742), the library 10, is available for normal operations.

It should be noted that, if it is not desired to actually read cartridge labels and store identity information, the reader 40 can merely indicate a cell label has been detected and an occupied or empty status indication stored with cell coordinates in the database. When multiple cells are scanned in this fashion, cells without a corresponding cell label are given an occupied status, by default, with an occupied indication stored with cell coordinates in the database.

During an operation to retrieve a desired cartridge from its cell, the library controller 25 obtains the cell coordinates of the cartridge from the database and moves the accessor directly to the proper location in the array of cells 12 and the cartridge retrieved. No scanning is necessary by the reader 40 because it is assumed that the database has accurate information. If the cartridge is not the desired one, an error recovery procedure is invoked.

If the accessor 16 is unsuccessful in returning a cartridge to a cell which has an empty status in the database, another recovery procedure is invoked. The library controller 25 directs the accessor 16 to place the cartridge in another cell. The accessor 16 then returns to the original cell to scans the cell and determine its actual state.

While the invention has been particularly shown and described with reference to preferred embodiments thereof, it will be understood by those skilled in the art that various changes in form and details may be made therein without departing from the spirit and scope of the invention.

What is claimed is:

1. An automated storage and retrieval system for removable information storage elements, comprising:
    array of cells for storing removable information elements, each information element having a unique machine readable, coded element mark fixed to an outside surface thereof, each cell having a front opening through which an information element can be inserted and removed and further having a machine readable cell mark on a surface thereof, said cell mark being visible through the front opening of said cell when said cell is empty and being obscured by an information element when said cell is occupied;
    a drive for reproducing information from a selected one of the information elements;
    an accessor for transporting said selected information element between one of said cells and said drive, said accessor having a vision system for reading said cell mark and said element mark; and
    a system controller interconnected to receive control instructions from a host device and direct actions of said accessor and said drive in response thereto, said system controller having an inventory table containing an address for each cell in said array, further having means for conducting an inventory of said cells whereby said system controller directs said accessor to move sequentially past the opening of each cell to detect an element mark if the cell is occupied by an element or a cell mark if the cell is empty, and store the cell status and cell address for each cell in said inventory table.

2. The system of claim 1, wherein:
    each cell mark comprises a coded label fixed to an inside surface of a cell.

3. The system of claim 1, wherein said information elements are magnetic tape cartridges and said drive comprises a magnetic tape drive.

4. The system of claim 1, wherein said information elements are optical disk cartridges and said drive comprises an optical disk drive.

5. The apparatus of claim 2, wherein said means for conducting an inventory comprises said vision system.

6. The apparatus of claim 1, wherein:
    each cell mark comprises a bar coded label fixed to an inside surface of a cell;
    each element mark comprises a bar coded label fixed to an outside surface of an information element and uniquely identifying the information element;
    said vision system comprises a bar code reader; and
    said means for conducting an inventory comprises said bar code reader.

7. A method for conducting an inventory of an automated information storage and retrieval system, comprising the steps:
    placing an information cartridge in at least one of a plurality of storage locations in the automated information storage and retrieval system;
    positioning a detector proximate to the opening of a first storage location of the plurality of storage locations;
    driving the detector sequentially across the openings of the first storage location and of the plurality of other storage locations;
    monitoring the detector for the presence of a mark of a first type or a mark of a second type at each location, a mark of the first type being located on an information cartridge and detectable when the information cartridge occupies a storage location and a mark of the second type being located on each storage location and detectable by the detector if the storage location is unoccupied and, if the detected mark is a mark of the first type, determining from the detected mark an identity of the information storage cartridge on which the detected mark is located;
    for each storage location, designating the storage location as having an occupied state if the detector detects a mark of the first type, and designating the storage location as having an unoccupied state if the detector detects a mark of the second type;
    storing in a memory the state of each storage location and the identity of each information cartridge on which a detected mark of the first type is located;
    designating a storage location as having an unknown state if the detector fails to detect either a mark of the first type or a mark of the second type at the storage location;
    re-positioning the detector proximate to the opening of the storage location and monitoring the detector for the presence of a mark of the first type or a mark of the second type;
    if a mark of the first type or a mark of the second type is still not detected, directing the gripper to physically examine the inside of the storage location and attempt to remove the information cartridge detected therein; and
    designating the storage location as having an invalid state if the gripper detects the information cartridge in the storage location and fails to remove it.

* * * * *